(12) United States Patent  (10) Patent No.: US 7,764,286 B1
Kumar  (45) Date of Patent: Jul. 27, 2010

(54) CREATING SHADOW EFFECTS IN A TWO-DIMENSIONAL IMAGING SPACE

(75) Inventor: Jayasheela Kumar, Karnataka (IN)

(73) Assignee: Adobe Systems Incorporated, San Jose, CA (US)

( * ) Notice: Subject to any disclaimer, the term of this patent is extended or adjusted under 35 U.S.C. 154(b) by 507 days.

(21) Appl. No.: 11/555,590

(22) Filed: Nov. 1, 2006

(51) Int. Cl.
*G06T 15/50* (2006.01)
*G06T 15/60* (2006.01)
*G06T 1/00* (2006.01)
*G06T 11/20* (2006.01)

(52) U.S. Cl. ................. 345/426; 345/418; 345/441; 345/442

(58) Field of Classification Search ................. 345/156, 345/418, 426, 441, 442
See application file for complete search history.

(56) References Cited

U.S. PATENT DOCUMENTS

| | | | | |
|---|---|---|---|---|
| 5,083,287 A | * | 1/1992 | Obata et al. | 345/426 |
| 5,175,806 A | * | 12/1992 | Muskovitz et al. | 345/582 |
| 5,422,986 A | * | 6/1995 | Neely | 345/426 |
| 5,568,595 A | * | 10/1996 | Yosefi et al. | 345/426 |
| 5,739,819 A | * | 4/1998 | Bar-Nahum | 345/426 |
| 5,742,292 A | * | 4/1998 | Murata | 345/426 |
| 5,844,566 A | * | 12/1998 | Lecland et al. | 345/426 |
| 5,870,098 A | * | 2/1999 | Gardiner | 345/426 |
| 5,986,670 A | * | 11/1999 | Dries et al. | 345/629 |
| 6,157,733 A | * | 12/2000 | Swain | 382/154 |
| 6,177,945 B1 | * | 1/2001 | Pleyer | 345/473 |
| 6,290,604 B2 | * | 9/2001 | Miyamoto et al. | 463/30 |
| 7,324,116 B2 | * | 1/2008 | Boyd et al. | 345/582 |
| 2001/0024201 A1 | * | 9/2001 | Hino et al. | 345/421 |
| 2002/0180727 A1 | * | 12/2002 | Guckenberger et al. | 345/418 |
| 2003/0058241 A1 | * | 3/2003 | Hsu | 345/426 |
| 2003/0112237 A1 | * | 6/2003 | Corbetta | 345/426 |
| 2003/0177187 A1 | * | 9/2003 | Levine et al. | 709/205 |
| 2003/0218610 A1 | * | 11/2003 | Mech et al. | 345/426 |
| 2004/0032409 A1 | * | 2/2004 | Girard | 345/426 |
| 2004/0049345 A1 | * | 3/2004 | McDonough et al. | 702/12 |
| 2004/0233930 A1 | * | 11/2004 | Colby, Jr. | 370/464 |
| 2004/0236874 A1 | * | 11/2004 | Largman et al. | 710/8 |
| 2005/0017974 A1 | * | 1/2005 | Hong et al. | 345/426 |
| 2006/0017729 A1 | * | 1/2006 | Chow et al. | 345/426 |
| 2007/0115275 A1 | * | 5/2007 | Cook et al. | 345/418 |

(Continued)

OTHER PUBLICATIONS

Adobe Creative Team, "Adobe Photoshop 6.0 and Adobe Illustrator 9.0 Advanced Classroom in a Book," Jun. 20, 2001, Adobe Press, Lesson 8. Mastering the Pen Tool, 23 pages, http://proquest.safaribooksonline.com/020172989X.*

(Continued)

*Primary Examiner*—Ulka Chauhan
*Assistant Examiner*—Roberta Prendergast
(74) *Attorney, Agent, or Firm*—Fish & Richardson P.C.

(57) ABSTRACT

This specification describes technologies relating to creation of shadow effects in a two-dimensional (2D) imaging space. In general, one aspect of the subject matter described in this specification can be embodied in a method that includes obtaining shadow orientation and length information of a source object in a 2D imaging space. The method also includes creating a shadow effect in the 2D imaging space based on the shadow orientation and length information. The shadow effect resembles a shadow falling on a perceptual three-dimensional (3D) background in the 2D imaging space. Other embodiments of this aspect include corresponding systems, apparatus, and computer program products.

20 Claims, 5 Drawing Sheets

U.S. PATENT DOCUMENTS

2007/0115283 A1* 5/2007 Foster .................. 345/426

OTHER PUBLICATIONS

Adobe Creative Team, "Adobe Photoshop CS2 Photographers' Guide", Jan. 1, 2005, Adobe Press, Chapter 5. Compositing in Photoshop CS, Other Selection Tools, 10 pages, http://proquest.safaribooksonline.com/1592007252.*

Xiaochun Cao; Shah, M., "Creating Realistic Shadows of Composited Objects," Application of Computer Vision, 2005. WACV/Motions '05 vol. 1. Seventh IEEE Workshops on , vol. 1, no., pp. 294-299, Jan. 5-7, 2005.*

* cited by examiner

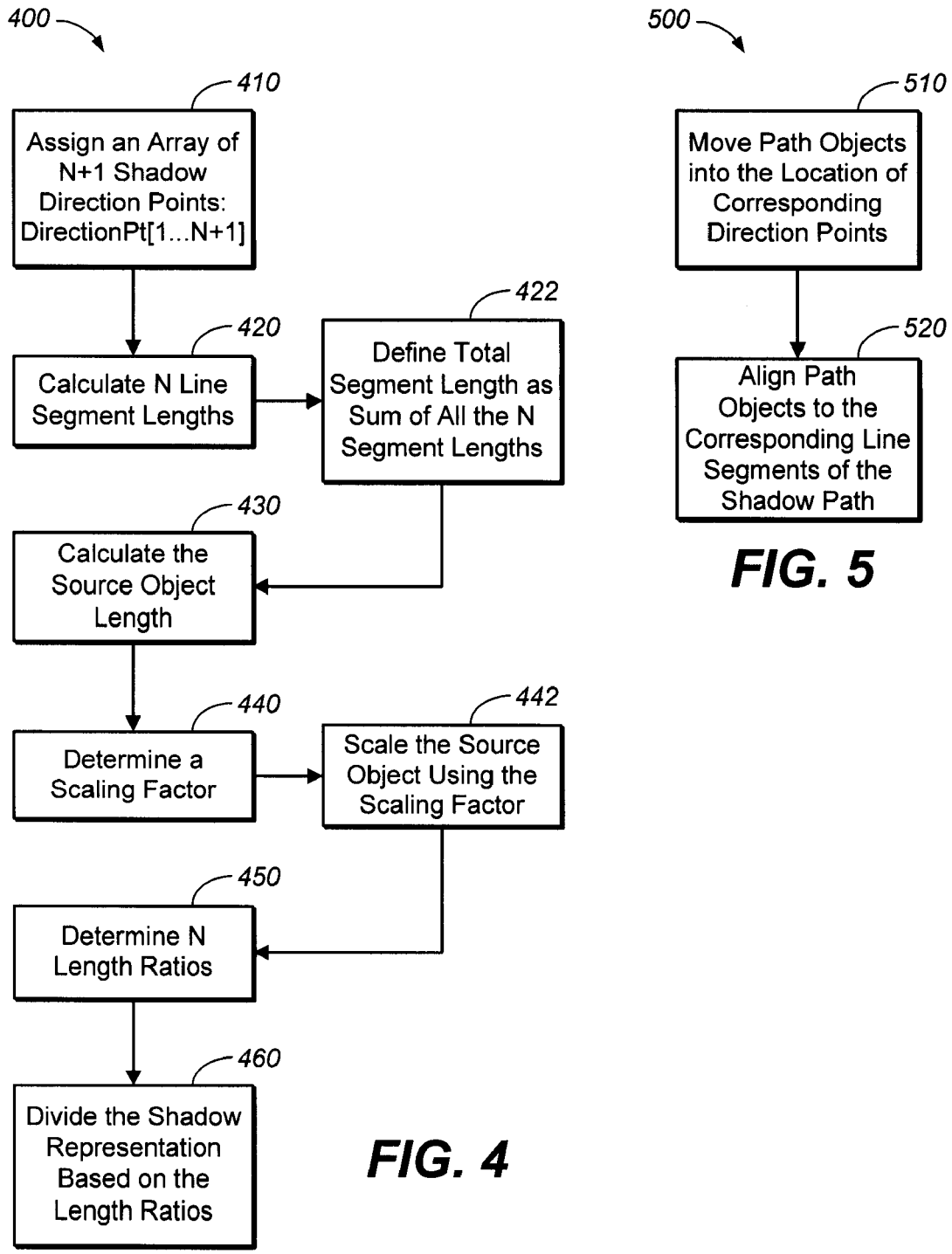

CREATING SHADOW EFFECTS IN A TWO-DIMENSIONAL IMAGING SPACE

BACKGROUND

The present disclosure relates to creating shadow effects for objects in a two-dimensional (2D) imaging space.

In computer graphics, a drop shadow is a visual effect that gives the perception of a three-dimensional (3D) background in a 2D imaging space. The drop shadow achieves this by drawing what looks like the shadow of an object, thereby giving the impression that the object is raised above the background. In general, a drop shadow is a grayscale copy of the object, drawn in a slightly different position. For example, a drop shadow for a simple rectangular object can be created by drawing a grayscale replica of the object, skewed and offset from the object.

In current applications, the shadow effect for a source object is a replica of the source object that is typically represented in grayscale to make the replica look like a shadow. Shadows are normally drawn as if they fall on a 2D background with a single source of light at some imaginary fixed point. In order to create a realistic shadow effect, the user may need to make replicas of shadows, transform the shadows to suit the topography of the background, clip the relevant portions of a shadow, and blend or group all of the clipped replicas to simulate a 3D shadow effect.

SUMMARY

This specification describes technologies relating to creation of shadow effects in a 2D imaging space. In general, one aspect of the subject matter described in this specification can be embodied in a method that includes obtaining shadow orientation and length information of a source object in a 2D imaging space. The method also includes creating a shadow effect in the 2D imaging space based on the shadow orientation and length information. The shadow effect resembles a shadow falling on a perceptual 3D background in the 2D imaging space. Other embodiments of this aspect include corresponding systems, apparatus, and computer program products.

Another aspect of the subject matter described in this specification can be embodied in a system that includes a user interface device; and one or more computers operable to create a shadow effect in a 2D imaging space based on shadow orientation and length information of a source object in the 2D imaging space. The shadow effect resembles a shadow falling on a perceptual 3D background in the 2D imaging space.

These and other embodiments can optionally include one or more of the following features. The obtaining of shadow orientation and length information can include presenting a user interface and receiving the shadow orientation and length information via the user interface. The user interface can include a pen tool for specifying anchor points and one or more line segments. The obtaining of shadow orientation and length information can include obtaining a shadow path with line segments having different orientations. The creation of the shadow effect can include transforming a shadow representation of the source object in accordance with the line segments.

The obtaining of a shadow path can include obtaining a Bezier curve. The transforming of the shadow representation can include dividing the shadow representation into path objects based on lengths of the line segments and a length of the source object. The transforming of the shadow representation can further include skewing the path objects of the shadow representation based on the different orientations of the line segments. The obtaining of a shadow path can further include obtaining the shadow path along with the source object. The creation of the shadow effect can further include generating the shadow representation of the source object in such a way that the generating, dividing, and skewing are performed dynamically at runtime.

The shadow orientation and length information can be represented by N connected line segments with a start point and an end point. N is an integer number indicating the number of surfaces on which the shadow should fall. The N line segments can indicate different portions of the shadow falling on a 3D-like background with different surfaces. The dividing of the shadow representation into N path objects can include assigning N+1 direction points based on the N line segments. The first of the direction points corresponds to the start point and the $(N+1)_{th}$ of the direction points corresponds to the end point of the N line segments.

The dividing of the shadow representation can also include determining N segment lengths of the N line segments and determining a source object length. The source object length can be a maximum vertical dimension, or the height, of the source object. The dividing of the shadow representation can further include determining a scaling factor between the source object length and sum of the N segment lengths, and scaling the source object based on the scaling factor. The dividing of the shadow representation can additionally include determining N length ratios, where the N length ratios are ratios of the N segment lengths over the sum of the N segment lengths. The dividing of the shadow representation can also include generating a shadow representation by replicating the scaled source object. The dividing of the shadow representation can further include dividing the shadow representation into N path objects based on the N length ratios and the N+1 direction points. Each of the N path objects can correspond to one of the N line segments.

The skewing of the path objects of the shadow representation can include moving each of the N path objects to a corresponding location of the direction points, and aligning the N path objects to the N line segments. Each of the N path objects can be parallel to each of the corresponding N line segments. The operations of obtaining the shadow orientation and length information and creating the shadow effect in a 2D imaging space can be repeated so that multiple shadow effects can be created in accordance with a number of light sources.

The one or more computers can include a server operable to interact with the user interface device through a data communication network, and the user interface device can be operable to interact with the server as a client. The user interface device can include a computer running a Web browser, a mobile telephone running a wireless application protocol (WAP) browser, or a personal digital assistant (PDA) running a WAP browser. Moreover, the one or more computers can include one personal computer, and the personal computer can include the user interface device.

Particular embodiments of the subject matter described in this specification can be implemented to realize one or more of the following advantages. A simple process can be achieved for creating shadow effects for 2D images in which user time and energy can be minimized. Further, realistic shadow effects can be created having shadow paths that follow the topography of a complicated background in a 2D imaging space. The potential difficulties in visualizing, calculating, and creating realistic shadow effects for a background with complex topography can be avoided.

A user can specify different points or draw irregular shapes for an imaginary 3D background with a simple operation (e.g. a mouse click) and the shadow can be automatically reshaped according to this user-specified background. The semi-automated process to achieve realistic shadow effects can avoid user error in calculating and drawing the shadows. Further, due to the ease of operation, a wider group of users can create realistic shadow effects.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 4 is a flow chart showing an example process of dividing a shadow representation of the source object into path objects.

FIG. 5 is a flow chart showing an example process of skewing the path objects of the shadow representation based on orientation information.

Like reference numbers and designations in the various drawings indicate like elements.

DETAILED DESCRIPTION

Figure 1:
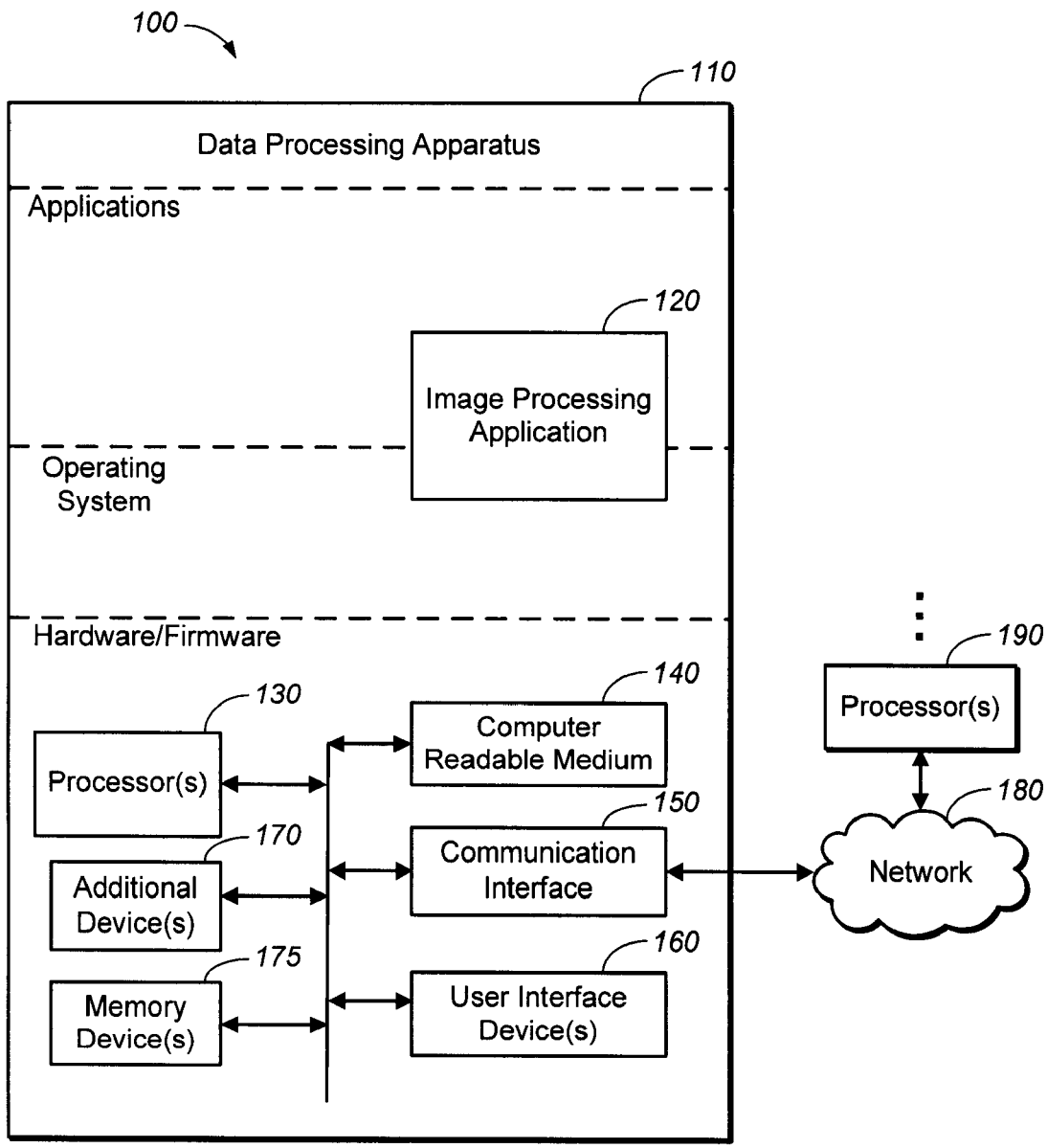
FIG. 1 shows an example system configured to output a 3D-like shadow effect for a source object in a 2D imaging space.

FIG. 1 shows an example system 100 configured to output a 3D-like shadow effect in a 2D imaging space. A data processing apparatus 110 can include hardware/firmware, an operating system and one or more applications, including an image processing application 120. As used herein, an application refers to a computer program that the user perceives as a distinct computer tool used for a well-defined purpose. An application 120 can be built entirely into the operating system (OS) of the data processing apparatus 110, or an application 120 can have different components located in different locations (e.g., one portion in the OS or kernel mode, one portion in the user mode, and one portion in a remote server), and an application 120 can be built on a runtime library serving as a software platform of the apparatus 110. Moreover, an application 120 can be a graphical user interface application (e.g., a Web browser) that connects to one or more processors 190 (e.g., one or more Web servers) over a network 180 and provides the computer tool as a network service.

The image processing application 120 can include visual effects software (e.g., Adobe® After Effects software, available from Adobe Systems Incorporated of San Jose, Calif.), image editing software (e.g., Adobe® Photoshop® software, available from Adobe Systems Incorporated of San Jose, Calif.), and video editing software (e.g., Adobe® Premiere® software, available from Adobe Systems Incorporated of San Jose, Calif.). Thus, the image processing application 120 can operate on digital images from many different sources. Moreover, a digital image (which for brevity will simply be referred to as an image) does not necessarily correspond to a file. An image may be stored in a portion of a file that holds other images, in a single file dedicated to the image in question, or in multiple coordinated files.

The data processing apparatus 110 includes one or more processors 130 and at least one computer-readable medium 140. The data processing apparatus 110 can also include a communication interface 150, one or more user interface devices 160, and one or more additional devices 170. The user interface device(s) 160 can include display screen(s), keyboard(s) (e.g., a custom video editing keyboard), mouse, stylus, or any combination thereof. Moreover, the data processing apparatus 110 can itself be considered a user interface device (e.g., when the image processing application 120 is delivered as a Web service).

The additional device(s) 170 can include various devices used for video and film editing. This can include a video controller coupled to a video recorder (which can be used for storing and importing video footage and for writing final output), a sound system, and a battery backup. Moreover, the subject matter described in this specification can be used in conjunction with any digital print engine or marking engine, display monitor, or other raster output device capable of producing color or gray scale pixels on paper, film, display screen, or other output medium. Memory device 175 can be a form of random access memory (RAM) such as a dynamic random access memory (DRAM), flash memory, synchronous dynamic random access memory (SDRAM), or other removable storage device. Once properly programmed, the data processing apparatus 110 is operable to output a 3D-like shadow effect for a source object in a 2D imaging space.

Figure 2:
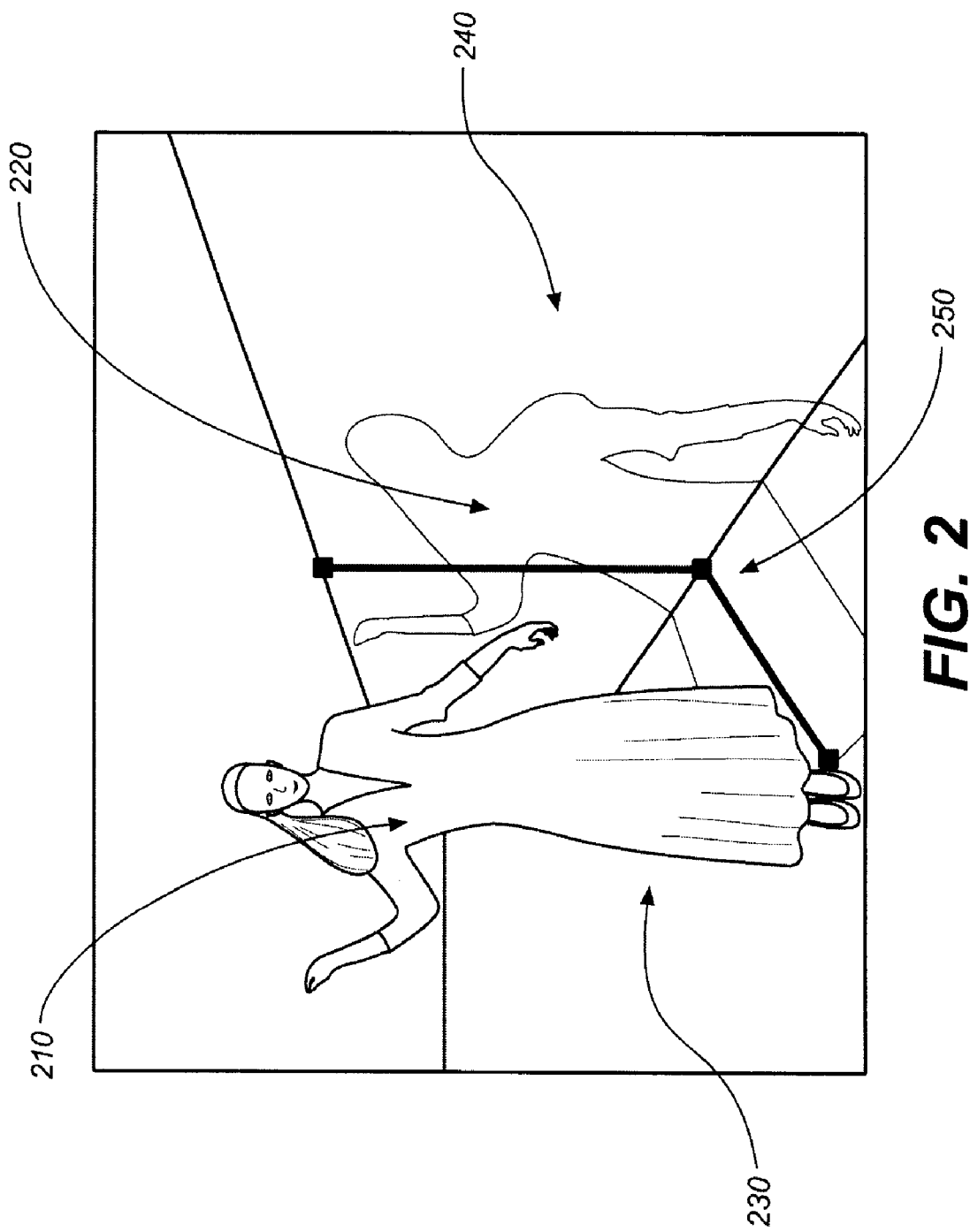
FIG. 2 shows an example 2D source object and its 3D-like shadow effect.

FIG. 2 shows an example 2D source object 210 and its 3D-like shadow effect 220. In this example, the source object 210 represents an image of a woman and the background includes the ground 230 on which the woman stands and the wall 240 right next to her. The ground 230 and wall 240 can be visual elements of a single 2D image object. This example illustrates the advantage of a 3D-like shadow effect in making the source object more realistic with respect to its surroundings. The shadow effect is 3D-like in the sense that 2D to image object(s) are arranged in the 2D imaging space such that they resemble a shadow falling on perceptual 3D objects in the background, even though the background object(s) are in fact only 2D in the computer system. 3D image objects are not used in the 2D image space. Note that this example only has a simple background with a single light source. However, more complicated backgrounds with complex topography and multiple light sources can be handled as well.

Figure 3:
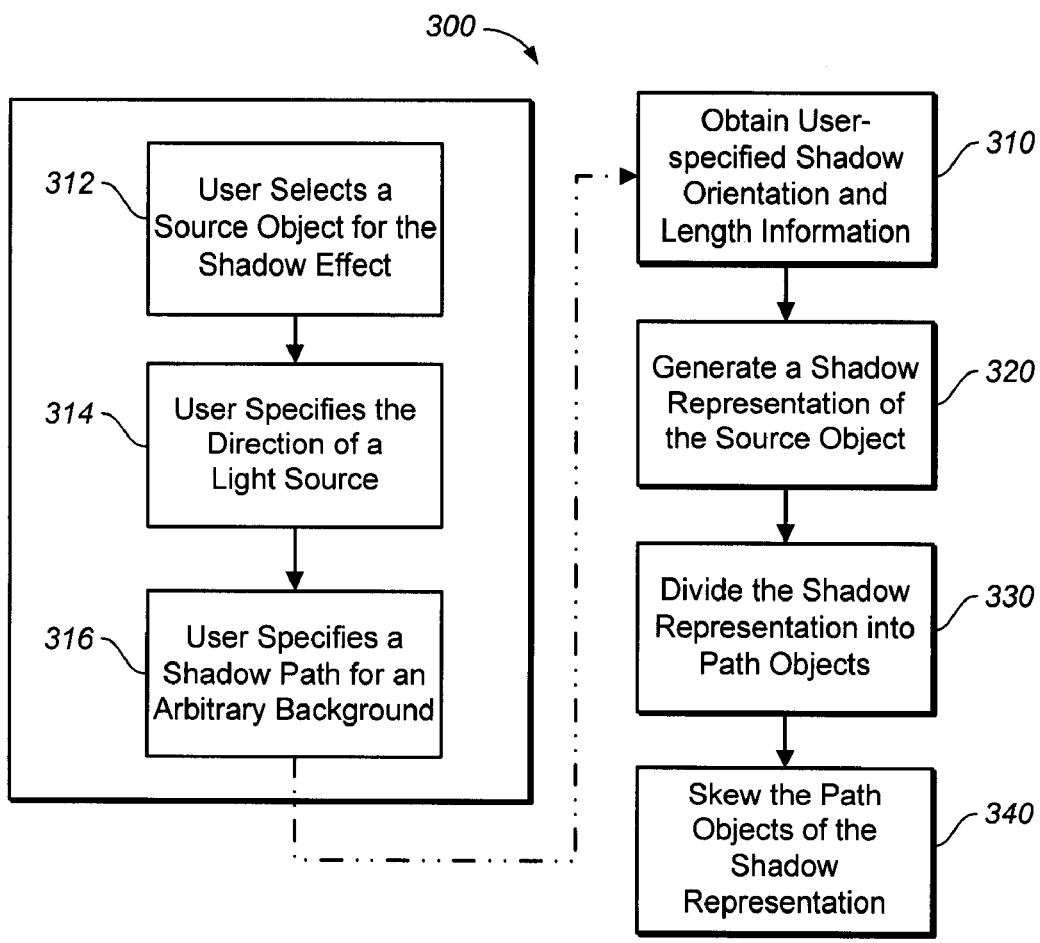
FIG. 3 is a flow chart showing an example process of creating a shadow effect based on shadow orientation and length information.

FIG. 3 is a flow chart showing an example process 300 of creating a 3D-like shadow effect for a source object in a 2D imaging space based on shadow orientation and length information. Shadow orientation and length information can be obtained 310 for the source object. The orientation and length information for the source object can be specified by a user in the image processing application of the data processing apparatus. For example, in the image processing environment, a user can select 312 the source object for the shadow effect. The user can specify 314 the direction of a light source for the shadow effect. The user can also specify 316 a shadow path for an arbitrary background. This shadow path can be represented by N line segments having different orientations, where N is an integer number indicating the number of surfaces on which a shadow should fall. The user-specified shadow path represented by N line segments can be one or more Bezier curves. The Bezier curve contains a finite number of points on it where the shadow changes direction. For example, in the example shown in FIG. 2, N=2 because the shadow 220 (as defined by a shadow path 250) falls on two different surfaces, one portion falling on the ground 230 and the other portion falling on the wall 240.

The shadow orientation and length information can be obtained 310 and a shadow representation of the source object can be generated 320. The shadow representation can be a replica of the source object. As will be discussed in further detail below, the shadow representation can have a scaling factor. The shadow representation can be a raster-based image with one grayscale channel and one alpha channel. Thus, it can have less color information than the original source object. However, if a user desires to represent the shadow effect in a color other than grayscale, the replicated source object can be represented by color channels. The shadow representation of the source object can be stored in a memory device (e.g., RAM or flash memory) of the data processing apparatus.

The shadow effects can be created by transforming the shadow representation and the shadow representation can be divided 330 into different path objects based on the user-specified length information and the length of the source object. If the user-specified shadow path falls on two surfaces (N=2), then the shadow representation can be divided into two path objects, each path object representing the portion of the shadow falling on each surface of the background. For example, the shadow effect 220 of FIG. 2 is represented by a shadow representation having two path objects: one piece corresponds to the portion of the shadow falling on the ground 230 and another piece corresponds to the portion of the shadow falling on the wall 240. Further, the path objects of the shadow representation can be skewed 340 based on the different orientations of the line segments in the user-specified shadow path. As will be discussed in further detail below, skewing the path objects can involve moving and aligning the path objects to the N line segments. For instance, the two portions (one on the ground 230 and the other on the wall 240) of the shadow effect 220 in FIG. 2 were skewed according to the shadow path 250.

Additionally, the shadow path of the source object can be obtained along with the source object. For example, a user can specify the shadow path for a source object and then save both the shadow path and the source object in a memory device without creating the shadow effects. The combination of shadow path and source object can then be retrieved at any-time and a shadow effect can be rendered at that point in time. Moreover, the operations involved in generating, dividing, and skewing the shadow representation can all be performed dynamically at runtime. For instance, once a user specifies the shadow path for a source object, a 3D-like shadow effect can be created without having to save shadow image(s) in the storage memory (e.g., the hard drive) of the data processing apparatus.

FIG. 4 is a flow chart showing an example process 400 of dividing a shadow representation of the source object into path objects. First, an array of N+1 shadow direction points for the shadow path (e.g., Bezier curve) can be assigned 410 based on the user-specified shadow path having N line segments. Therefore, DirectionPt[1, 2, . . . , N+1] can denote an array of shadow direction points, where DirectionPt[1] is the start point of the shadow path and DirectionPt[N+1] is the end point of the shadow path. The lengths of the N line segments can be calculated 420. For example, the length of line segment 1 is equivalent to the distance between DirectionPt[1] and DirectionPt[2]; whereas, the length of line segment N is equivalent to the distance between DirectionPt[N] and DirectionPt[N+1]. A total segment length for the shadow path can be defined 422 as the sum of all the N line segment lengths. A length of the source object can be calculated 430 as the maximum vertical dimension, or height, of the source object.

A scaling factor can be determined 440 as the ratio between the source object length and the total segment length. The scaling factor takes into account the potential difference in size between the source object and its shadow effect. For example, given that the size of the shadow effect for a source object is a function of the direction and distance of the light source to the source object, the size of the shadow effect can be the same, smaller, or larger than the size of the source object. The scaling factor can be used in the generation of a shadow representation of the source object. The source object (and its corresponding shadow representation) can be scaled 442 according to the scaling factor. The N length ratios can be determined 450 based on the ratio of each of the N segment lengths to that of the total segment length. Essentially, the length ratios correspond to the portions of the shadow falling on each respective background surface. For example, the shadow effect 220 of FIG. 2 may have a length ratio of 0.4 for the ground surface 230 and 0.6 for the wall surface 240. Further, the shadow representation can be divided 460 into path objects according to the length ratio of each of the line segments. Referring again to FIG. 2, suppose that the length ratios are 0.4 and 0.6 for the portion of the shadow falling on the ground 230 and the wall 240, respectively, then path object 1 would represent 40% of the shadow representation and path object 2 would represent 60% of the shadow representation.

FIG. 5 is a flow chart showing an example process 500 of skewing the path objects of the shadow representation. Each of the path objects can be moved 510 to the location of its corresponding shadow direction point. For example, path object 1 can be moved to the location of DirectionPt[1] of the Bezier curve, and path object 2 can be moved to the location of DirectionPt[2] of the Bezier curve. Further, the path objects can be aligned 520 to their corresponding line segments of the user-specified shadow path. For instance, after moving path object 1 to the location of DirectionPt[1] on the Bezier curve, path object 1 is aligned to line segment 1 so that it parallels line segment 1 of the shadow path. As a result, the skewed path objects form a 3D-like shadow effect corresponding to the user-specified shadow path.

Figure 6:
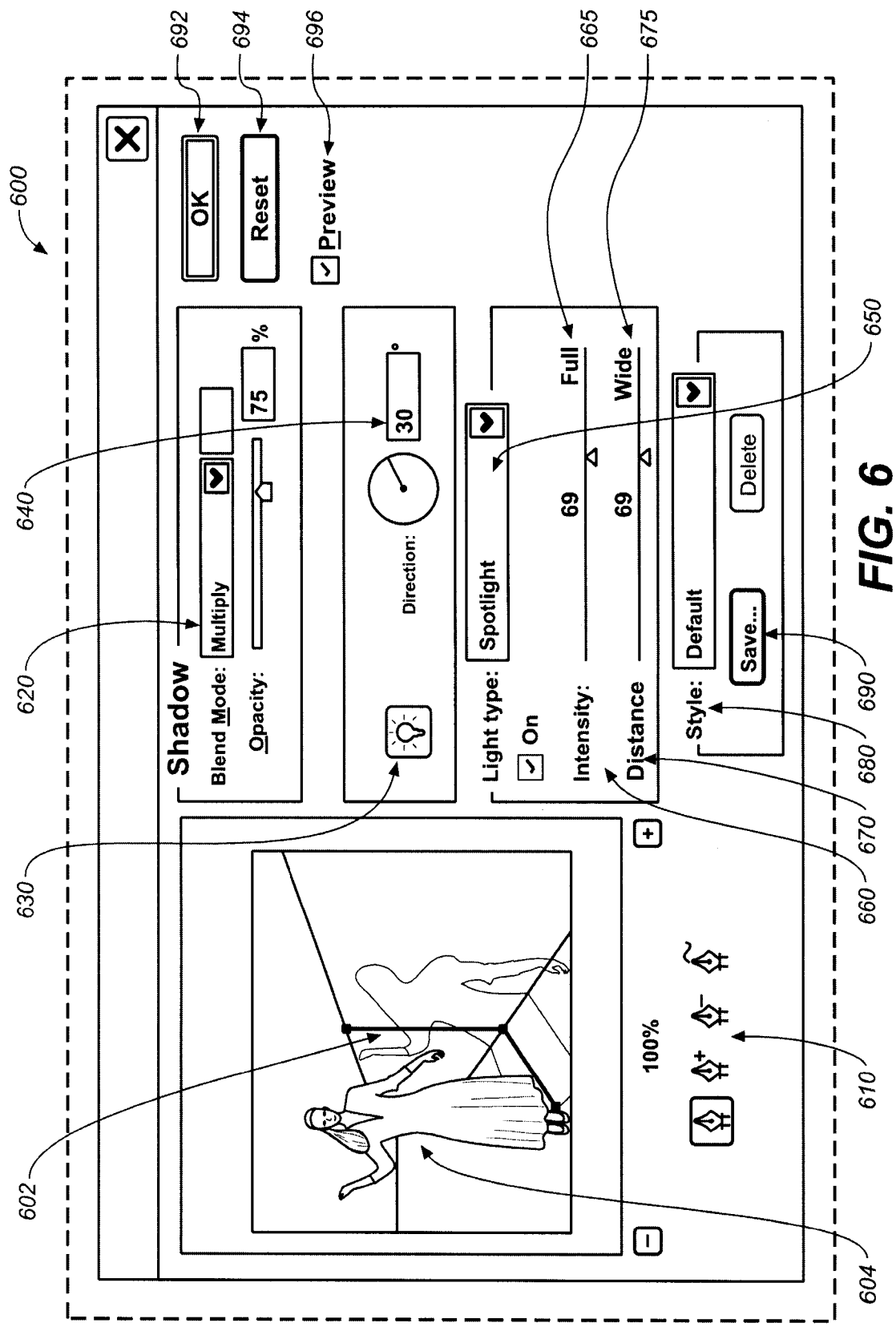
FIG. 6 shows an example graphical user interface for accepting shadow orientation and length information in creating 3D-like shadow effects for a 2D source object.

FIG. 6 shows an example graphical user interface (GUI) 600 for accepting shadow orientation and length information in creating 3D-like shadow effects for a 2D source object. Within the GUI 600, a user may specify a shadow path 602 for a source object 604 using a tool 610. The tool 610 can be a pen tool that is typically used in image processing applications for defining vector graphics (e.g., Bezier curves). The pen tool can include a straight pen tool, an add-anchor-point tool, a delete-anchor-point tool, and a freeform pen tool. The straight pen tool can allow a user to create a path (e.g., a Bezier curve) by defining anchor points and line segments. The add-anchor-point tool can allow a user to add additional anchor points to an existing path. The delete-anchor-tool can allow a user to subtract existing points from a path. For example, given the ground and the wall as the background for the shadow effect, a user may draw two line segments denoting the shadow path 602 using the straight pen tool. If the background topography (ground and wall) becomes more complex (e.g., ground and a rock with various surfaces), then a user may use the add-anchor-point tool to create more anchor points and line segments in the shadow path.

Additionally, a user may specify the shadow characteristics 620 by choosing the color of the shadow or the opacity value of the shadow. The user may specify that the shadow effect be represented by a grayscale shadow representation; or the user may specify that the shadow be in color. The user may also specify the opacity of the shadow based on the lighting environment for the source object, and the alpha channel of the shadow representation can be adjusted accordingly.

The GUI 600 also provides the user with the option of a dummy light source 630 for changing the direction of the shadow by entering an angle 640. As discussed above, the user may specify the shadow path 602 based on an initial direction of the light source (e.g., above the source object at noon time) by drawing line segments of a Bezier curve using the tool 610. However, if the user desires to represent the shadow effect for a new direction of the light source (e.g., sunset), the user may then specify a new angle 640 for the direction of the shadow. Once the new angle of the shadow has been specified by the user, the line segments of the Bezier curve will move accordingly and the direction of the shadow will then move to a corresponding orientation.

The user may also specify the type 650 of light sources for the shadow effect. For example, the light source can be the sun, the moon, a spotlight, a street light, etc. The user may further specify the intensity 660 of the light source for the shadow effect. For instance, the user may drag the triangle on the intensity scale 665 to adjust the intensity of the light source. Similarly, the user may specify the distance 670 of the light source to the source object. As discussed above, the distance of the light source to the source object will affect the size of the shadow effect. By dragging the triangle on the distance scale 675, a user can adjust the scaling factor for the shadow representation. Moreover, the user may specify the style 680 of the shadow effect and then save 690 the changes in a disk memory (e.g., hard drive).

The GUI 600 can also allow the user to finalize the shadow orientation and length information by clicking on the "OK" button 692. Alternatively, a user may undo all the specified information by clicking on the "Reset" button 694. Moreover, the user may decide whether to preview the adjustments to the shadow effect by selecting the "Preview" 696 box in the GUI 600.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
    obtaining shadow orientation and length information of a source object in a two-dimensional (2D) imaging space; and
    creating a shadow effect in the 2D imaging space based on the shadow orientation and length information, wherein the shadow effect resembles a shadow falling on a perceptual three-dimensional (3D) background in the 2D imaging space;
    wherein obtaining the shadow orientation and length information comprises obtaining a shadow path comprising line segments having different orientations, and creating the shadow effect comprises transforming a shadow representation of the source object in accordance with the line segments, and the different orientations of the line segments correspond to different perceptual surfaces of the perceptual 3D background on which the shadow representation is to fall;
    wherein the shadow path is distinct from the shadow representation; wherein the creating is performed by one or more computers.

2. The method of claim 1, wherein the obtaining comprises:
    presenting a user interface; and
    receiving the shadow orientation and length information via the user interface.

3. The method of claim 2, wherein the receiving comprises specifying anchor points and one or more line segments by using a pen tool.

4. The method of claim 1, wherein obtaining the shadow path comprises obtaining a Bezier curve.

5. The method of claim 1, wherein transforming the shadow representation comprises:
    dividing the shadow representation into path objects based on lengths of the line segments and a length of the source object; and
    skewing the path objects of the shadow representation based on the different orientations of the line segments.

6. The method of claim 5, wherein obtaining the shadow path comprises obtaining the shadow path along with the source object, and creating the shadow effect comprises generating the shadow representation of the source object, wherein the generating, dividing and skewing are performed dynamically at runtime.

7. A computer program product, encoded on a non-transitory computer-readable medium, operable to cause data processing apparatus to perform operations comprising:
    obtaining shadow orientation and length information of a source object in a two-dimensional (2D) imaging space; and
    creating a shadow effect in the 2D imaging space based on the shadow orientation and length information, wherein the shadow effect resembles a shadow falling on a perceptual three-dimensional (3D) background in the 2D imaging space;
    wherein obtaining the shadow orientation and length information comprises obtaining a shadow path comprising line segments having different orientations, and creating the shadow effect comprises transforming a shadow representation of the source object in accordance with the line segments, and the different orientations of the line segments correspond to different perceptual surfaces of the perceptual 3D background on which the shadow representation is to fall;
    wherein the shadow path is distinct from the shadow representation.

8. The computer program product of claim 7, wherein the obtaining comprises:
    presenting a user interface; and
    receiving the shadow orientation and length information via the user interface.

9. The computer program product of claim 8, wherein the receiving comprises using a pen tool for specifying anchor points and one or more line segments.

10. The computer program product of claim 7, wherein obtaining the shadow path comprises obtaining a Bezier curve.

11. The computer program product of claim 7, wherein transforming the shadow representation comprises:
    dividing the shadow representation into path objects based on lengths of the line segments and a length of the source object; and
    skewing the path objects of the shadow representation based on the different orientations of the line segments.

12. The computer program product of claim 11, wherein obtaining the shadow path comprises obtaining the shadow path along with the source object, and creating the shadow effect comprises generating the shadow representation of the source object, wherein the generating, dividing and skewing are performed dynamically at runtime.

13. A system comprising:
a user interface device; and
one or more computers operable to interact with the user interface device and to create a shadow effect in a two-dimensional (2D) imaging space based on shadow orientation and length information of a source object in the 2D imaging space, wherein the shadow effect resembles a shadow falling on a perceptual three-dimensional (3D) background in the 2D imaging space;
wherein the one or more computers operable to obtain a shadow path comprising line segments having different orientations, and the one or more computers operable to create the shadow effect by transforming a shadow representation of the source object in accordance with the line segments, and the different orientations of the line segments correspond to different perceptual surfaces of the perceptual 3D background on which the shadow representation is to fall;
wherein the shadow path is distinct from the shadow representation.

14. The system of claim 13, wherein the user interface device comprises a pen tool for specifying anchor points and one or more line segments.

15. The system of claim 13, wherein the shadow path comprises a Bezier curve.

16. The system of claim 13, wherein the one or more computers operable to
divide the shadow representation into path objects based on lengths of the line segments and a length of the source object; and
skew the path objects of the shadow representation based on the different orientations of the line segments.

17. The system of claim 16, wherein the one or more computers operable to obtain the shadow path along with the source object, and to generate the shadow representation of the source object, and wherein one or more computers operable to generate, divide, and skew the shadow representation dynamically at runtime.

18. The system of claim 16, wherein the user interface device comprises personal computer running a Web browser, a mobile telephone running a WAP browser, or a PDA running a WAP browser.

19. The system of claim 13, wherein the one or more computers comprise a server operable to interact with the user interface device through a data communication network, and the user interface device is operable to interact with the server as a client.

20. The system of claim 13, wherein the one or more computers comprises one personal computer, and the personal computer comprises the user interface device.

* * * * *